Oct. 9, 1962  C. H. McALPINE ET AL  3,057,453
GRID FEEDING DEVICE
Filed Oct. 29, 1959  5 Sheets-Sheet 1
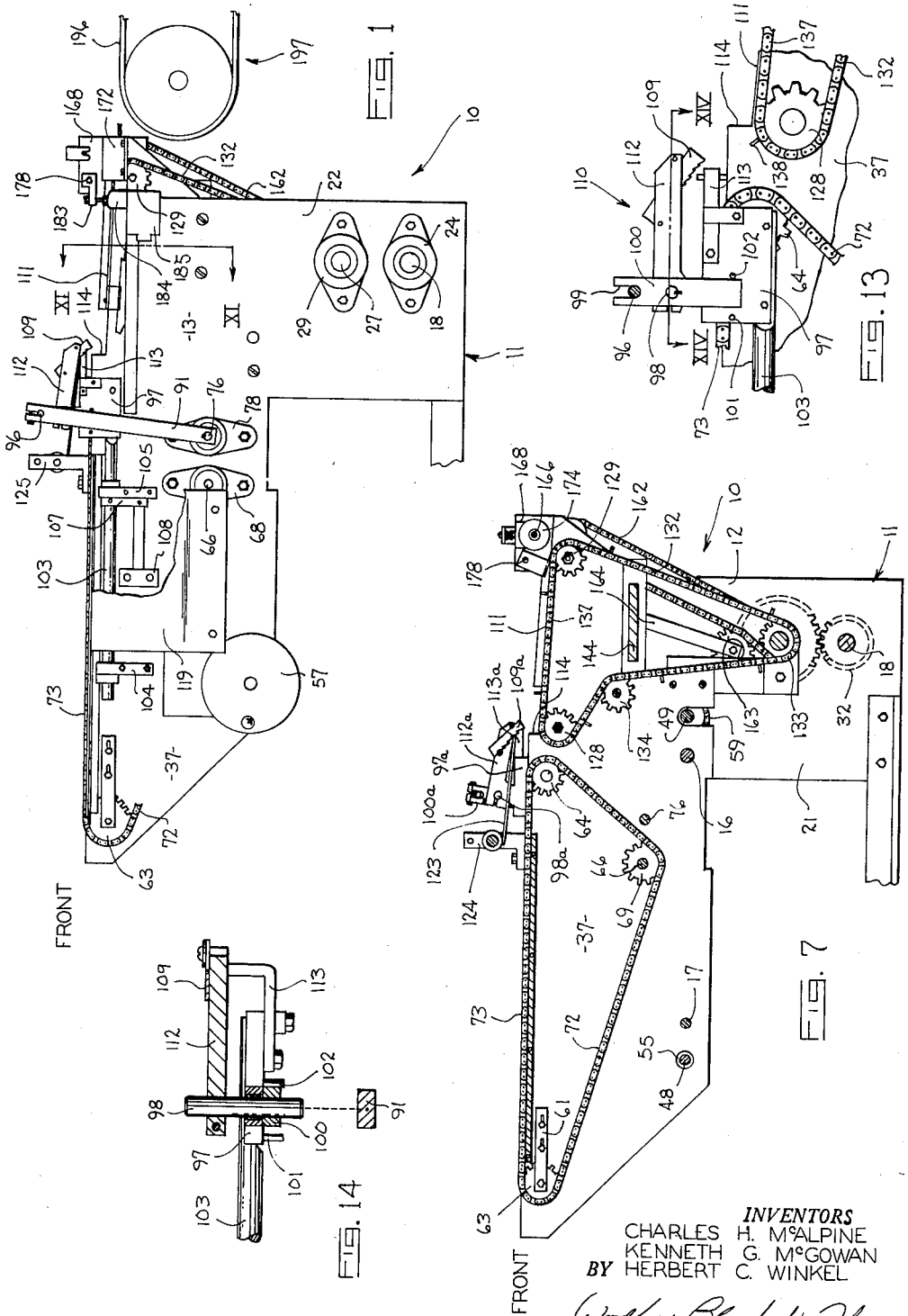
INVENTORS
CHARLES H. McALPINE
KENNETH G. McGOWAN
BY HERBERT C. WINKEL
Woodhams Blanchard & Flynn
ATTORNEYS Oct. 9, 1962   C. H. McALPINE ET AL   3,057,453
GRID FEEDING DEVICE
Filed Oct. 29, 1959   5 Sheets—Sheet 2
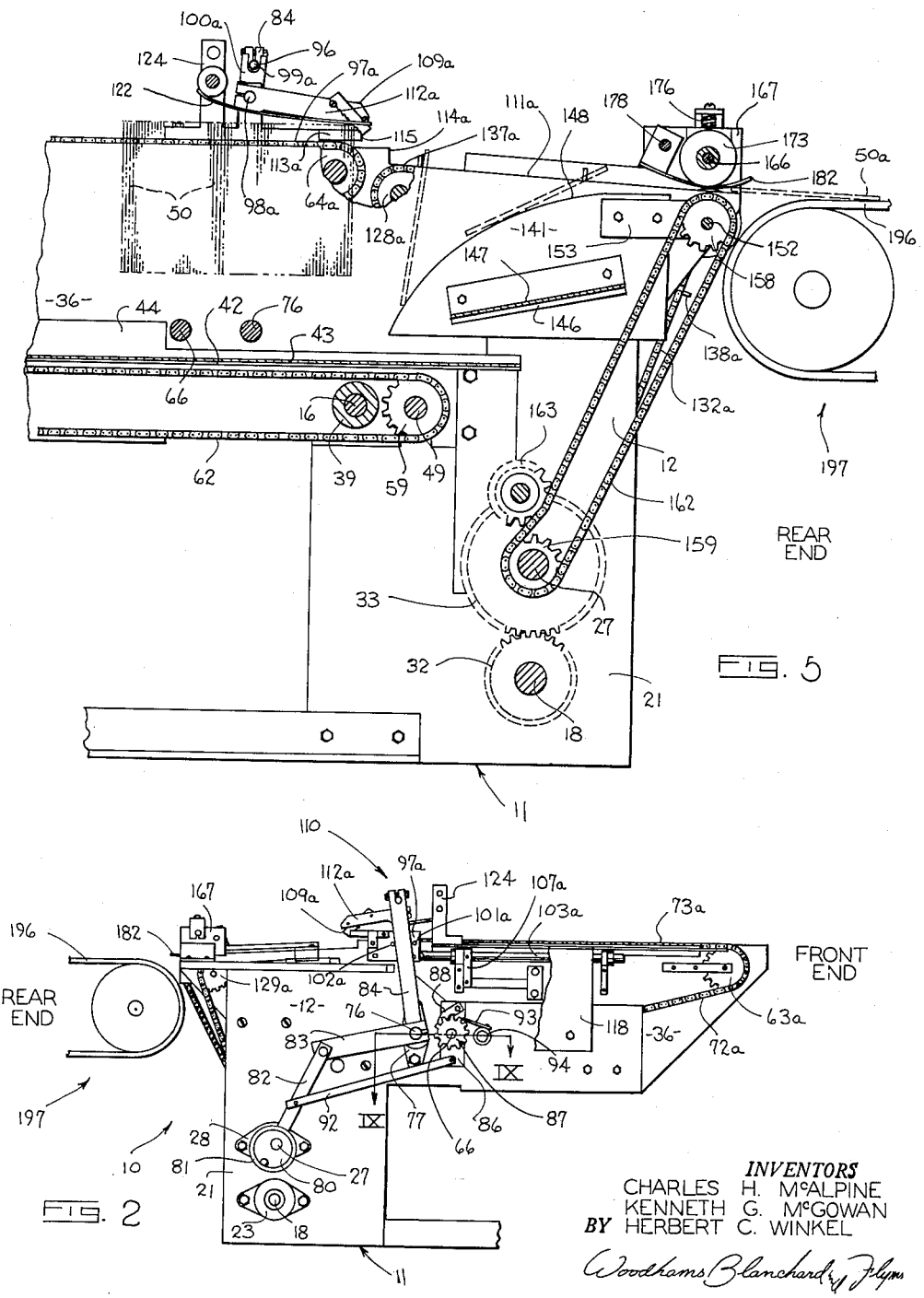
INVENTORS
CHARLES H. McALPINE
KENNETH G. McGOWAN
BY HERBERT C. WINKEL
Woodhams Blanchard y Flynn
ATTORNEYS Oct. 9, 1962    C. H. McALPINE ET AL    3,057,453
GRID FEEDING DEVICE
Filed Oct. 29, 1959    5 Sheets-Sheet 3

INVENTORS
CHARLES H. McALPINE
KENNETH G. McGOWAN
BY HERBERT C. WINKEL

Woodhams Blanchard & Flynn
ATTORNEYS

Oct. 9, 1962

C. H. McALPINE ET AL 3,057,453

GRID FEEDING DEVICE

Filed Oct. 29, 1959

*INVENTORS*
CHARLES H. McALPINE
KENNETH G. McGOWAN
BY HERBERT C. WINKEL

Woodhams Blanchard & Flynn
ATTORNEYS

Oct. 9, 1962 C. H. McALPINE ET AL 3,057,453
GRID FEEDING DEVICE
Filed Oct. 29, 1959 5 Sheets-Sheet 5

*INVENTORS*
CHARLES H. McALPINE
KENNETH G. McGOWAN
*BY* HERBERT C. WINKEL

*Woodhams Blanchard & Flynn*
ATTORNEYS

United States Patent Office 3,057,453
Patented Oct. 9, 1962

3,057,453
GRID FEEDING DEVICE
Charles H. McAlpine, Coloma, Kenneth G. McGowan, Lawrence Township, Van Buren County, and Herbert C. Winkel, Watervliet, Mich., assignors to Winkel Machine Co., Inc., Watervliet, Mich., a corporation of Michigan
Filed Oct. 29, 1959, Ser. No. 849,646
15 Claims. (Cl. 198—33)

This invention relates to a work feeding device and it relates particularly to a device for receiving a plurality of panels, such as battery plate grids, and feeding them successively in coplanar edge-to-edge relationship onto a planar surface, such as the conveyor belt of a grid pasting machine.

While the apparatus of the present invention is applicable to a wide variety of specific uses, the particular embodiment herein utilized to illustrate the invention, and the need out of which said invention arose, relate to the manufacture of component parts for storage batteries. Accordingly, the invention will be set forth in terms of a machine adapted to the handling of storage battery components. However, such specific reference will be recognized as for illustrative purposes only and not as limiting.

There has been a constant effort over a great many years to make the manufacture of storage batteries progressively more automatic. However, there is such a diversity of sizes, proportions and materials from which battery grids and battery separators are fabricated that the designing of machines capable of handling these diverse sizes, proportions and materials has been a serious problem, which has in many instances held back the successful use of automatic machinery. For example, many battery making plants, particularly the smaller ones, have only relatively limited runs of battery plates or separators of given sizes and materials. Therefore, any machine for handling battery plate components must be capable of easy and rapid adjustment to accommodate itself to a variety of sizes, proportions and materials with respect to the components being handled.

More particularly in connection with feeding stacked panels to a pasting machine, such panels are normally received in stacked form from a casting machine in which said grids are made, such a machine being shown in patent application of Herbert C. Winkel, Serial No. 612,501, and they are to be fed to a pasting machine of the type shown in the Patent No. 2,669,376 issued to Herbert C. Winkel. In other words, the feeding mechanism of the present invention is intended to replace the feeding mechanism shown in the last-named patent.

Accordingly, the objects of the invention are:

(1) To provide a battery panel feeding machine capable of receiving stacked panels and feeding them one at a time into coplanar edge-to-edge relationship with respect to each other.

(2) To provide a machine, as aforesaid, applicable particularly to the handling of battery plate grids.

(3) To provide a machine, as aforesaid, which can be readily adjusted to accommodate itself to operation with panels of a variety of sizes, proportions and materials.

(4) To provide a machine, as aforesaid, which will receive stacked panels and move them continuously toward the feeding end and will then remove said panels one at a time from the leading end of the stack and deliver them in edge-to-edge coplanar relationship to receiving means.

(5) To provide a machine, as aforesaid, in which said panels are removed under positive mechanical control from said stack and delivered to the discharge end of said machine.

(6) To provide a machine, as aforesaid, wherein adjustment for the width of the panels may be made by a single control.

(7) To provide a machine, as aforesaid, in which all functions thereof can be driven from a single source.

(8) To provide a machine, as aforesaid, which will be simple in construction and which can be manufactured and operated with maximum efficiency and with a high degree of accuracy.

(9) To provide a machine, as aforesaid, which is sufficiently simple that it can be maintained in good operating condition by ordinary workmen and with a minimum of attention.

(10) To provide a machine, as aforesaid, which will be of sufficient simplicity as to require a minimum of maintenance.

Other objects and purposes of the invention will become apparent to persons familiar with this type of equipment upon reading the following specification and examining the accompanying drawings, in which:

FIGURE 1 is a broken side view of a feeding machine embodying the invention and arranged to discharge the panels at the rightward end.

FIGURE 2 is a broken side view of the opposite side of the feeding machine.

FIGURE 5 is a section taken on the line V—V of FIGURE 4.

FIGURE 7 is a section taken on the line VII—VII of FIGURE 4.

FIGURE 13 is a sectional view similar to that shown in FIGURE 12 with the parts thereof in different relative positions.

FIGURE 14 is a sectional view taken along the line XIV—XIV in FIGURE 13.

Figure 4:
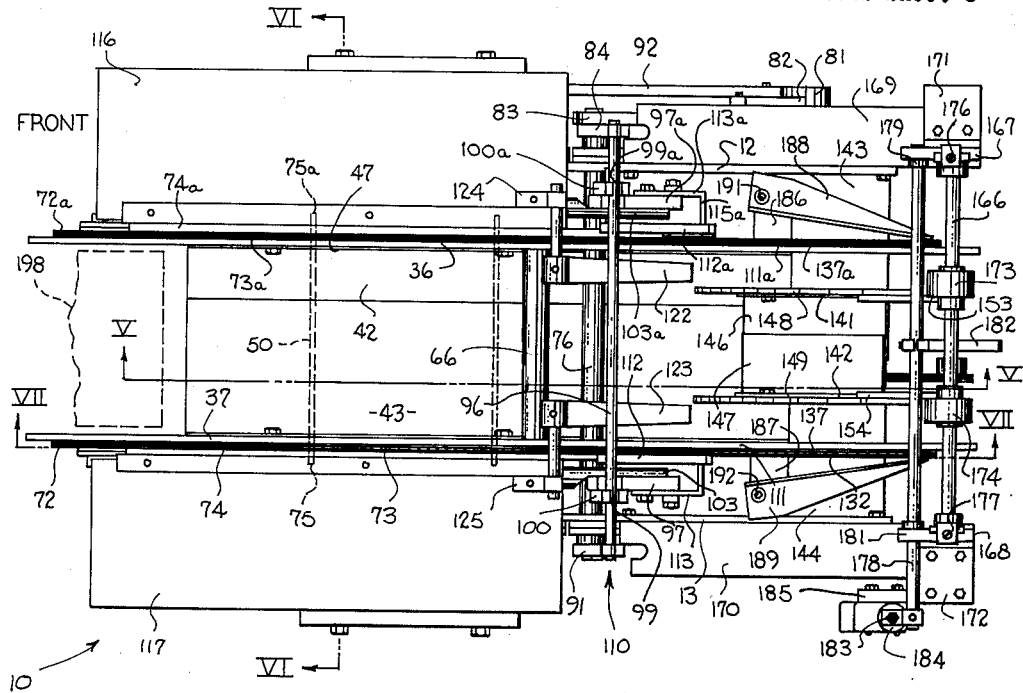
FIGURE 4 is a top view of the machine.

For convenience in reference, certain terminology will be used hereinafter which will be recognized as employed for convenience only and not as limiting. For example, the term "forward," derivatives thereof and words of similar import will be used in connection with the input end of the machine, namely, the leftward end of the machine as appearing in FIGURES 1 and 4, and the term "rearward" will refer to the discharge end of the machine, namely, the rightward end of the machine as appearing in FIGURES 1 and 4. The terms "rightward," "leftward" and words of similar import and derivatives thereof should be taken with reference to the direction of movement of the material through the machine, FIGURE 1 showing the rightward side of the machine and FIGURE 2 showing the leftward side of the machine. The terms "upward," "downward" and derivatives thereof and words of similar import will refer to directions in connection with the normal position of use of the machine and further in connection with the machine as shown in FIGURES 1 and 2 of the drawings. The terms "inner," "outer" and derivatives thereof and words of similar import will be taken to refer to directions toward and away from the geometric center of the machine.

*General Description*

The objects and purposes of the invention, including those set forth above, have been met by providing a machine for effecting a synchronizing of, and controlling the movement of a plurality of panels, such as battery grids or other battery components, from a receiving point to a discharge point. In this specific embodiment, the grid transferring machine is arranged to receive battery grids from a combined grid casting and grid trimming machine, such as that shown in said patent application Serial No. 612,501, and feeding said grids to the conveyor of a grid pasting machine, such as that disclosed in said Patent No. 2,669,376.

The grid feeding machine of the invention is comprised of a base frame having a conveyor which may be operatively associated with the discharge end of a grid casting and trimming machine and is preferably arranged to receive automatically the properly trimmed grids from the casting machine. The grids are advanced intermittently by the receiving conveyor to a station near the center of the machine where a discharge conveyor commences. Selection mechanism is mounted upon the framework and intermittently operated in synchronization with the receiving conveyor for the purpose of engaging one grid at a time and transferring said grid from the station onto the discharge conveyor. More specifically, as one grid is transferred from the station to the discharge conveyor, another grid is moved into said station for subsequent transfer.

The discharge conveyor moves continuously and at a faster rate than the receiving conveyor. Positioning members are provided in association with the discharge conveyor for moving the grids, one at a time, from a substantially vertical position into a substantially horizontal position while they are being moved by said discharge conveyor. Discharge mechanism is provided in cooperation with the discharge conveyor for transferring the horizontally positioned grids from the discharge conveyor onto a platform, such as the conveyor of a grid pasting machine. It is very important in this particular embodiment that the operation of the discharge conveyor and the discharge mechanism be capable of easy and accurate synchronization with the movement of the grid pasting conveyor in order that the grids will be moved onto said pasting conveyor in edge-to-edge relationship for the reasons set forth in said Patent No. 2,669,376.

*Detailed Construction*

Figure 3:
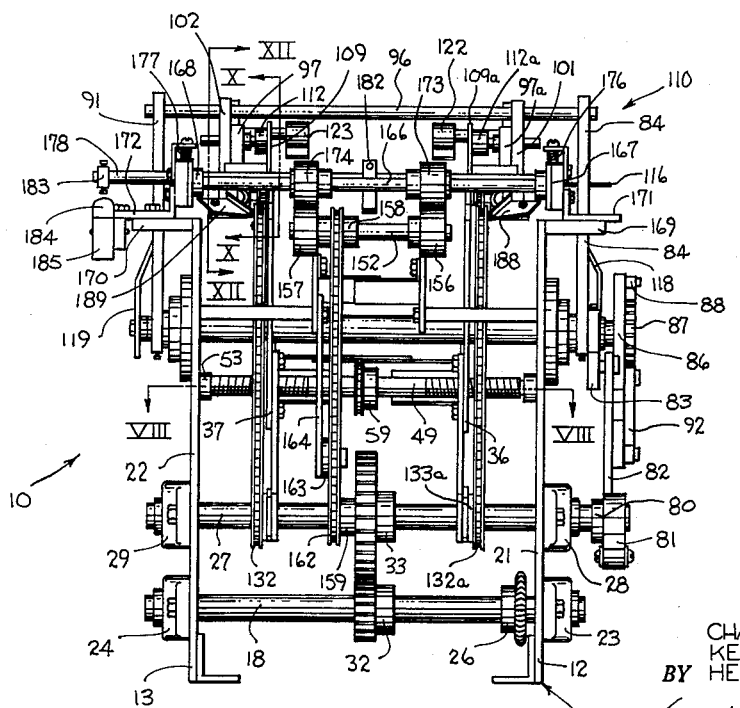
FIGURE 3 is an end view of the machine taken at the discharge end thereof.
Figure 8:
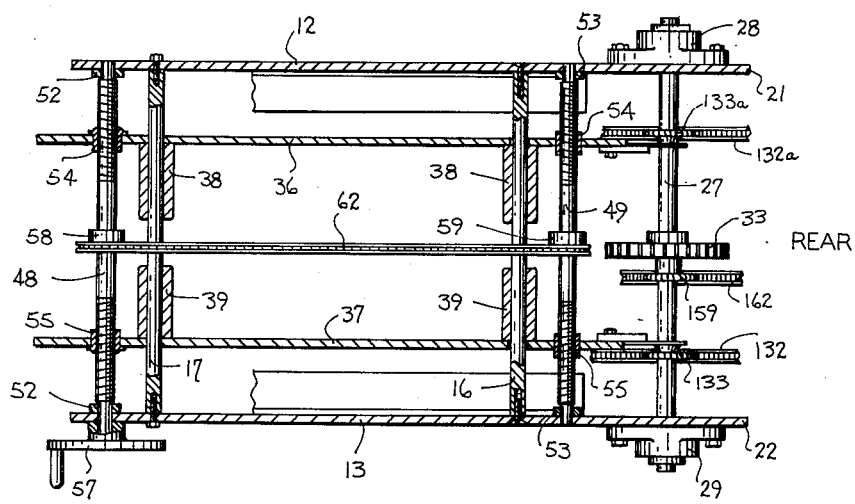
FIGURE 8 is a section taken on the line VIII—VIII of FIGURE 3.

The grid feeding machine 10, (FIGURES 1, 2, 3 and 4), herein selected to illustrate a preferred embodiment of the invention, is comprised of a frame structure 11 having a pair of similar, substantially L-shaped side plates 12 and 13 (FIGURES 3 and 4) which are held in fixed position with respect to each other by means including the cross rods 16 and 17 (FIGURE 8).

A drive shaft 18 (FIGURE 3) is rotatably supported upon and between the rearward, downwardly extending ends 21 and 22 of the side plates 12 and 13, respectively, by means of suitable bearings 23 and 24 mounted upon said side plates. A sprocket 26 is mounted on the drive shaft 18 for engagement by drive means, not shown, for the purpose of rotating the drive shaft 18. A jack shaft 27 is rotatably supported upon and between the side plates 12 and 13 above, and parallel with, the drive shaft 18 by suitable bearings 28 and 29. A pair of operably engaged gears 32 and 33 are mounted upon the drive shaft 18 and jack shaft 27, respectively, for the purpose of rotating the jack shaft 27 in response to rotation of the drive shaft 18.

Figure 6:
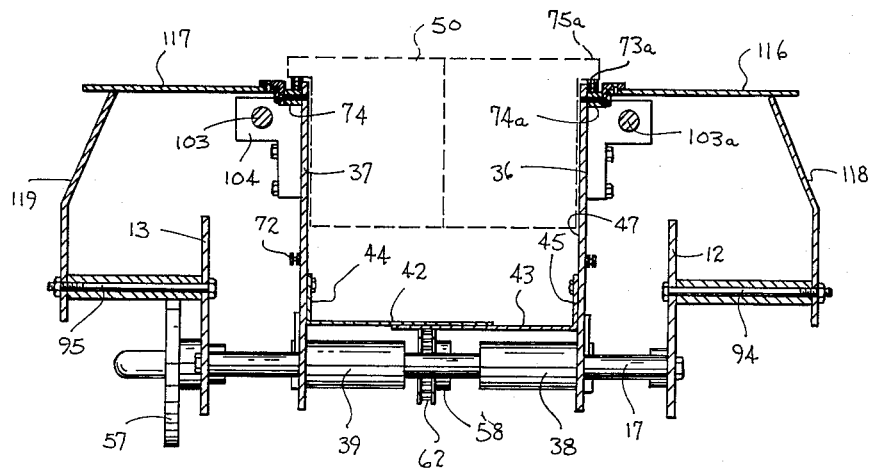
FIGURE 6 is a section taken on the line VI—VI of FIGURE 4.

A pair of similar, elongated guide plates 36 and 37 (FIGURES 6 and 8) are disposed between the side plates 12 and 13 and parallel therewith. Two pairs of sleeves 38 and 39 (FIGURE 8) are mounted respectively upon the opposing sides of the guide plates 36 and 37 near the lower edges thereof, one pair of sleeves being axially aligned with the other pair for slidably receiving the cross rods 16 and 17. A pair of flanged bottom sheets 42 and 43 (FIGURE 6) have their flanges 44 and 45 secured respectively to the opposing surfaces of the guide plates 36 and 37 directly above and adjacent to the sleeves 38 and 39 so that said sheets 42 and 43 are in overlapping relationship. Accordingly, and as shown in FIGURE 6, the guide plates 36 and 37 and the sheets 42 and 43 define the side walls and bottom wall, respectively, of an upwardly opening grid guiding compartment 47, which extends from the receiving end of the machine 10 to the central portion thereof.

The width of the compartment 47 is adjustable to accommodate grids 50 of different sizes. More specifically, a pair of screws 48 and 49 (FIGURE 8), which have righthand threads on one end and lefthand threads on the other end thereof, are rotatably supported in bearings 52 and 53, respectively, upon and between the opposing surfaces of the side plates 12 and 13 so that their axes preferably lie in the same horizontal plane with the axes of the cross rods 16 and 17 (FIGURE 8). The screws 48 and 49 are threadedly received through threaded collars 54 and 55 (FIGURE 8) affixed in suitable openings in the guide plates 36 and 37, respectively. Accordingly, simultaneous rotation of the screws 48 and 49 effects simultaneous, lateral movement of said guide plates 36 and 37 toward and away from each other. A crank 57 is mounted upon the extended, rightward end of the front screw 48 for effecting rotation of said screw 48. A pair of sprockets 58 and 59 are mounted upon and rotatable with the screws 48 and 49, preferably midway between the ends thereof, and are interconnected by a chain 62. Accordingly, rotation of the screw 48 results in a corresponding rotation of the screw 49.

Figure 9:
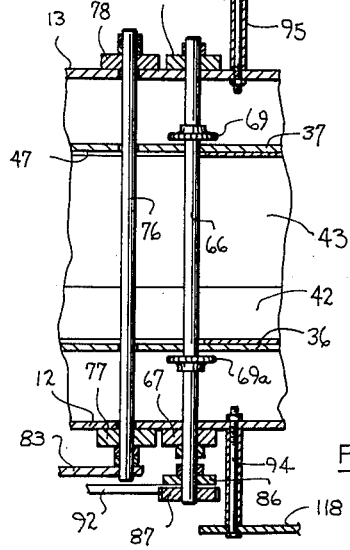
FIGURE 9 is a section taken on the line IX—IX of FIGURE 2.

A pair of input conveyor sprockets 63 and 64 (FIGURE 7) are rotatably mounted upon, and adjacent to, the outer surface of the guide plate 37 near the upper edge thereof. The sprocket 63 is adjustably supported upon the plate 37, adjacent to the extreme front end thereof by the adjustment bar 61. The sprocket 64 is located approximately midway between the front and rear ends of said guide plate 37 and is radially aligned with sprocket 63. A ratchet shaft 66 is rotatably supported by means of the bearings 67 and 68 (FIGURE 9) upon the side plates 12 and 13, respectively, and slidably extends through the guide plates 36 and 37. A sprocket 69 is mounted upon the ratchet shaft 66 adjacent to the guide plate 37 and in radial alignment with the sprocket 63. Said sprocket 69 is rotatable with, and slidable lengthwise of, the shaft 66. The sprockets 63, 64 and 69 are operably engaged by an input conveyor chain 72 having a substantially horizontal reach 73 (FIGURE 7) which is parallel with and projects slightly above the upper horizontal edge of the guide plate 37. The reach 73 is slidably supported between the sprockets 63 and 64 by the support bar 74 (FIGURE 6) which is secured to the outer surface of the guide plate 37 adjacent to and parallel with its upper edge.

A second input conveyor chain 72a (FIGURES 2 and 4) is mounted upon the outer surface of the guide plate 36 by means including the sprockets 63a and 69a (FIGURE 9) in substantially the same manner as set forth in detail above with respect to the chain 62. Said chain 72a has an upper reach 73a (FIGURE 4) which is supported upon the guide plate 36 by the bar 74a (FIGURE 6) parallel with and slightly above the upper edge of the guide plate. The reaches 73 and 73a (FIGURE 6) are arranged so that they are engageable by the ears or lugs 75 and 75a, respectively, which extend from the opposite edges of a grid 50 when said grid is disposed within the compartment 47.

A pivot shaft 76 (FIGURE 9) is pivotally supported upon the side plates 12 and 13 by means of the bearings 77 and 78, respectively, near to and parallel with the ratchet shaft 66. A ring 81 (FIGURES 2 and 3) is rotatably supported by an eccentric hub 80 mounted upon the rightward end of the jack shaft 27 outwardly of the bearing 29, and an actuating arm 82 is secured to said ring 81 and extends radially therefrom. A link bar 83 is pivotally connected at one end to the outer end of the actuating arm 82 (FIGURE 2) and adjustably connected at its other end to the pivot shaft 76. Accordingly, rotation of the jack shaft 27 operates through the eccentrically supported ring 81 to effect a pivoting of the pivot shaft 76. A pivot arm 84 is secured at one end to the pivot shaft 76, adjacent to the link bar 83, and extends upwardly therefrom, above the upper edge of the adjacent side plate 12.

A vertically elongated actuating bar 86 (FIGURES 2 and 3) is pivotally supported upon the ratchet shaft 66 (FIGURE 9) outwardly of and near the bearing 67. A ratchet wheel 87 is secured to, and rotatable with, the rightward end (FIGURE 2) of the ratchet shaft 66 adjacent to the actuating bar 86. A pawl 88 is pivotally supported upon the upper end of the actuating bar 86 adjacent to the ratchet wheel 87 for engagement with the teeth on said ratchet wheel 87. A link bar 92 is pivotally supported at one end upon the lower end of the actuating bar 86 and pivotally mounted at its other end upon the actuating arm 82 at a point about midway between the ends thereof. The link bar 92 is reciprocated by movement of the actuating arm 82 and the eccentric ring 81 whereby the actuating bar 86 is oscillated around the axis of the ratchet shaft 66. Each oscillation causes the pawl 88 to engage the ratchet wheel 87 and effect a rotational movement of the wheel in a predetermined amount.

A detent 93 (FIGURE 2), which may be a leaf spring, is adjustably mounted at one end upon a post 94 which is secured to, and extends outwardly from, the side plate 12 adjacent to the ratchet wheel 87. The other end of the detent 93 is engageable with the teeth on the ratchet wheel 87 whereby it prevents rotation of said ratchet wheel in a clockwise direction, as appearing in FIGURE 2, but does not materially interfere with the rotation of the ratchet wheel 87 in the opposite direction of rotation.

Figure 11:
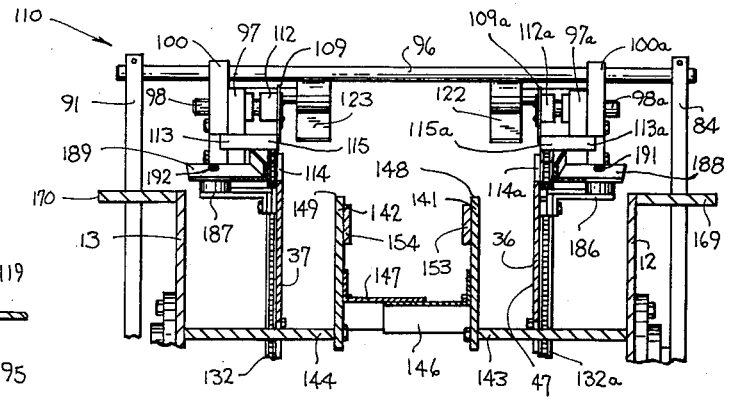
FIGURE 11 is a section taken on the line XI—XI of FIGURE 1.

As shown in FIGURE 11, a pivot arm 91 is secured to and rotatable with the left end of the pivot 76 and extends in the same radial direction from said shaft as the pivot arm 84. A connecting rod 96 is secured to, and extends between, the upper ends of the pivot arms 84 and 91. A pair of grid transfer blocks 97 and 97a are mounted upon the outer sides of the guide plates 37 and 36, respectively, below the rod 96 for movement lengthwise of said guide plates. A pair of coaxial stub shafts 98 and 98a are pivotally mounted upon the blocks 97 and 97a, respectively, near their upper ends. A pair of lost motion bars 100 and 100a are secured to, and pivotable with, the remote, outer ends of the shafts 98 and 98a, respectively. The upper ends of the bars 100 and 100a (FIGURE 4) have slots 99 and 99a into which the connecting rod 96 is vertically, slidably and rotatably received.

Figure 12:
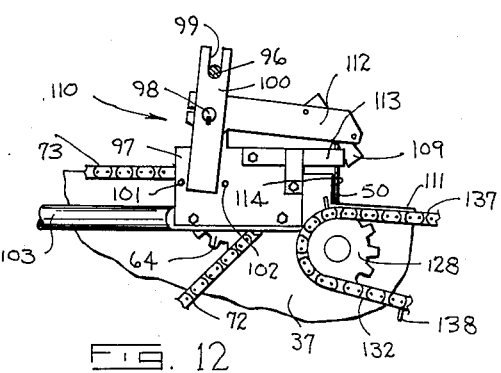
FIGURE 12 is a sectional view substantially as taken along the line XII—XII in FIGURE 3.
Figure 15:
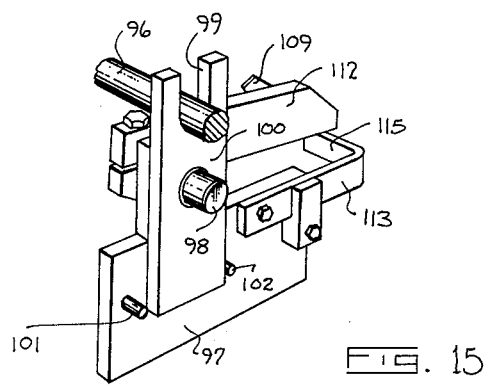
FIGURE 15 is a perspective view of a part of the grid-transferring mechanism.

A pair of limit pins 101 and 102 (FIGURES 12 and 15) are secured to, and extend outwardly from, said transfer block 97 on opposite sides of the lost motion bar 100 near the lower end thereof. The pins 101 and 102 are arranged so that they are engageable by the bar 100 for limiting the pivotal movement thereof. Another pair of pins 101a and 102a (FIGURE 2) are mounted upon the block 97a for limiting the pivotal movement of the bar 100a, which is pivotally supported thereon.

The transfer block 97 (FIGURES 1 and 4) is secured to the rear end of a horizontal support rod 103 which is mounted upon the guide plate 37 by means of the brackets 104 and 105 (FIGURE 1) for lengthwise sliding movement in a direction parallel with the reach 73 of the chain 72. An L-shaped control member 107 has a vertical leg adjustably secured to the support rod 103 and a horizontal leg slidably engaged by the bracket 108 which is mounted upon the guide plate 37. The control member 107 controls the rotational position of the support rod 103.

Figure 10:
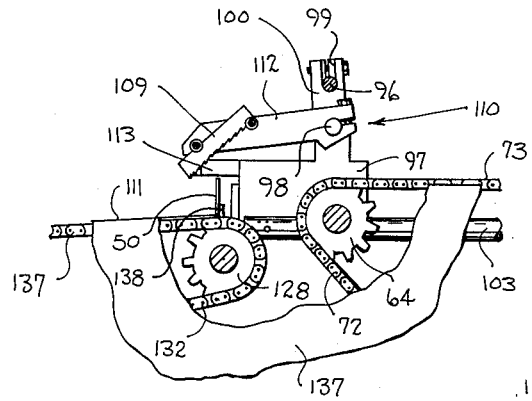
FIGURE 10 is a section taken on the line X—X of FIGURE 3.

A hook-support bar 112 (FIGURES 10, 11 and 12) is adjustably supported at one end upon the inner end of the stub shaft 98, inwardly of the transfer block 97, and extends rearwardly therefrom. A grid-engaging hook 109, which may be a portion of a hack saw blade, is adjustably supported upon the rear end of the hook-supporting bar 112. A grid-retarding arm 113 is pivotally supported at its front end upon the transfer block 97 and extends rearwardly therefrom. Said arm 113 has, adjacent to the grid-engaging hook 109, an inwardly extending flange 115 which is engageable by the ears 75 (FIGURE 6) on grids being moved by the chains 72 and 72a.

The pivot arms 84 and 91, and the parts connected thereto by the rod 96, such as the transfer blocks 97 and 97a, may be referred to as the grid-transferring mechanism 110.

The upper edge of the guide plate 37 (FIGURES 7 and 13) is offset downwardly to form a short, upright edge 114, which is located near to, and rearwardly of, the sprocket 64. The edge 114 is also located so that the inwardly extending portion 115 of the blocking arm 113 (FIGURES 12 and 13) can move from a position forwardly of said edge to a position rearwardly of said edge. During such movement, a grid 50 is urged by the hooks 109 and 109a to move past the edges 114 and 114a where they drop onto the rear portions 111 and 111a of the upper edges of said plates 37 and 36, respectively.

The transfer block 97a (FIGURE 2) is mounted upon a support arm 103a and is engaged by a control member 107a in substantially the same manner as set forth above with respect to the transfer block 97. A grid-engaging hook 109a (FIGURE 5) and a grid-blocking arm 113a are supported upon the transfer block 97a, also as set forth above with respect to the transfer block 97.

Sidewardly extending shelves 116 and 117 (FIGURES 4 and 6) are mounted upon the support bars 74 and 74a, respectively, which are secured to the guide plates 36 and 37. Aprons 118 and 119 are supported upon the outer ends of posts 94 and 95 which are secured to the side plates 12 and 13 (FIGURE 6). Said aprons extend upwardly to engage the lower surfaces of the shelves 116 and 117, respectively. Forwardly extending substantially horizontal leaf springs 122 and 123 (FIGURES 4 and 11) are supported at their rearward ends by the brackets 124 and 125 upon the shelves 116 and 117, respectively.

The front ends of the springs 122 and 123 are disposed just frontwardly of, and above, the edges 114a and 114, respectively, and between the planes defined by the inner surfaces of the guide plates 36 and 37. Thus, the springs 122 and 123 are located to engage the upper edges of the grids 50 supported upon the conveyor chains 72 and 72a, when said grids are adjacent to the rear ends of the reaches 73 and 73a.

The sprockets 128 and 129 (FIGURE 7) are rotatably supported upon the outer side of the guide plate 37 adjacent to the upper edge thereof. The sprocket 128 is located adjacent to the sprocket 64 and preferably directly below the edge 114 of said guide plate 37. A chain 132 extends around the sprockets 128 and 129 and is drivingly engaged by a sprocket 133 supported upon, and rotatable with, the jack shaft 27. A tension sprocket 134, which is engageable with the chain 132 between the sprockets 128 and 133, is rotatably and adjustably mounted upon the outer surface of the guide plate 37.

The chain 132 (FIGURE 7) has an upper, substantially horizontal reach 137, which is parallel with, and is disposed slightly below, the upper edge of the guide plate 37 between the edge or shoulder 114 and a point near to, but spaced from, the rear end of the guide plate 37. A chain 132a (FIGURE 5), which is similar to the chain 132, is driven by a pulley 133a (FIGURE 9) on the jack shaft 27 and has an upper reach 137a (FIGURE 4) parallel with and slightly below the upper edge of the guide plate 36 near its rearward end. The chains 137 and 137a each have a plurality of similarly spaced lugs 138 which extend outwardly therefrom to engage the ears 75 and 75a on grids 50 and thereby move it along the edges 111 and 111a, between the guide plates 36 and 37.

A pair of parallel cam plates 141 and 142 (FIGURES 4 and 11) are disposed between, and parallel with, the rear ends of the guide plates 36 and 37. Said cam plates 141 and 142 are supported upon the rear ends of the side plates 12 and 13, respectively, by means of the support bars 143 and 144, respectively, which extend under the rear ends of the guide plates 36 and 37. A pair of flanged, overlapping shields 146 and 147 are secured to and disposed between the cam plates 141 and 142, respectively, for protecting the shafts and gears located directly below the cam plates 141 and 142. The cam plates 141 and 142 have upper cam edges 148 and 149 which, as shown in FIGURE 5 with respect to cam plate 141, curve smoothly upwardly and rearwardly to points near to and slightly below the plane defined by the upper edges 111 and 111a of the plates 37 and 36. Accordingly, a grid 50 (FIGURE 5), which is moved rearwardly by the lugs 138 and 138a on the chains 132 and 132a (FIGURE 4), engages the cams 141 and 142 and is moved thereby from a substantially vertical position into a substantially horizontal position 50a.

A lower roller shaft 152 (FIGURE 3) is rotatably supported by means of the shaft support bars 153 and 154 (FIGURE 4) upon the rear ends, respectively, of the cam plates 141 and 142. A pair of resiliently flexible rollers 156 and 157 (FIGURE 3) are mounted upon the roller shaft 152 so that they are radially aligned with and adjacent to the rear edges of the cam plates 141 and 142. The upper surfaces of the roller 156 and 157 preferably lie adjacent to said plane defined by the upper edges 111 and 111a. A sprocket 158 on the roller shaft 152 is connected to a sprocket 159 on the jack shaft 27 by a chain 162. A tensioning sprocket 163 (FIGURE 5) engages the chain 162 and is rotatably supported upon a tension bar 164 (FIGURE 3), which is adjustably mounted upon the cam plate 141.

An upper roller shaft 166 (FIGURE 3) is rotatably engaged near its opposite ends by the bearings 167 and 168, which are located near the rear, upper edges of the side plates 12 and 13, respectively. A pair of sidewardly extending shelves 169 and 170 are mounted upon the side plates 12 and 13, respectively, adjacent to the upper edges thereof and at the rearward ends thereof. The bearings 167 and 168 are vertically slidably supported upon the bearing supports 171 and 172 which are mounted upon the shelves 169 and 170. A pair of rollers 173 and 174 are mounted upon and rotatable with the shaft 166 so that they are directly above, and peripherally engageable with, the rollers 156 and 157, respectively. Springs 176 and 177 are supported within the bearing supports 171 and 172, respectively, and held under compression against the bearings 167 and 168 whereby the rollers 173 and 174 are resiliently urged into engagement with the rollers 156 and 157.

A cross rod 178 (FIGURE 3) is pivotally supported near its opposite ends upon the bearing brackets 179 and 181 (FIGURE 4) which are in turn mounted upon the bearing supports 171 and 172. An actuating arm 182 is secured to the cross rod 178 between the end thereof and extends between the shafts 152 and 166, and between the rollers thereon. Said arm 182 is held in the raised position by engagement with grids 50 which pass between said rollers. A switch actuator 183 is mounted upon the rightward end of the cross rod 178 to operate a normally open switch 184 which is mounted upon the shelf 170 (FIGURE 4). To switch 184 is held closed as long as there is a continuous, edge-to-edge flow of grids through the rollers 156, 157, 173 and 174. However, if there is a break in such a flow, the arm 182 drops and the switch 184 is opened, which stops the machine.

A pair of guide arm brackets 186 and 187 (FIGURE 4) are supported upon the outer surfaces of the guide plates 36 and 37 (FIGURE 11) about midway between the cross rod 178 (FIGURE 3) and a line connecting the shoulders 114 and 114a (FIGURE 11). A pair of elongated guide arms 188 and 189 are adjustably secured near their front ends to the guide arm brackets 186 and 187, respectively, by the bolts 191 and 192 for movement around substantially vertical axes. The guide arms 188 and 189 are disposed adjacent to, outwardly of, and slightly above the upper edges 111 and 111a of the plates 36 and 37, respectively, for the purpose of engaging the ears of lugs 75 and 75a on the grids 50 and thereby aligning the grids as they enter between the rollers 173 and 174 and the rollers 156 and 157.

The conveyor 196 (FIGURES 1 and 5) on a grid pasting machine 197, similar to that shown in Patent No. 2,669,376, is disposed adjacent to the rear end of the feeding machine 10 so that grids 50 can be advanced in a horizontal position by the rollers 156, 157, 173 and 174 onto the conveyor 196.

As shown by broken lines at 198 in FIGURE 4, the discharge end of a grid casting and trimming machine, similar to the one shown in application Serial No. 612,501, may be arranged with respect to the feeding machine 10 so that battery grids 50 are transferred, as they are produced by the grid caster 198, onto the reaches of 73 and 73a of the conveyor chains 72 and 72a. Alternatively, the grids 50 can be loaded in groups upon the conveyor chains 72 and 72a.

*Operation*

The feeding machine 10 is prepared for operation first by adjusting the guide plates 36 and 37 with respect to each other so that a grid 50 will be slidably movable along the grid compartment 47 by the chains 72 and 72a (FIGURE 6) when the ears 75 and 75a are supported upon the upper reaches 73 and 73a. The adjustment is accomplished by turning the crank 57 (FIGURE 1) on the screw 48 (FIGURE 8) whereby the chain 62 causes both of the screws 48 and 49 to turn simultaneously. The guide plates 36 and 37 are moved toward or away from each other by appropriate rotation of the crank 57 in one direction or the other.

The arms 112 and 112a (FIGURE 11) are rotatably adjusted on the stub shafts 98 and 98a so that their grid engaging hooks 109 and 109a will be above the rearmost grid when it is being urged forwardly by the grid retarding arms 113 and 113a. The actuating arm 83 (FIGURES 2 and 9) is rotatably adjusted on the pivot shaft 76 so that the arms 84 and 91 will effect the desired grid movement, as described hereinafter. The guide arms 188 and 189 are adjusted for the proper distance between the outer ends of the ears 75 and 75a. The conveyor 196 of the pasting machine 197 may be placed adjacent to the front end of the feeding machine 10, after which the discharge end 198 (FIGURE 4) of the grid-casting machine may be placed adjacent to or near to the front or receiving end of the feeding machine 10. Grids produced by the casting machine 198 may be received one at a time onto the chain 72 and 72a, or may be placed thereon in a large group, preferably so that the rear end of the group of grids is adjacent to the grid-retarding arms 113 and 113a. The drive shaft 18 is now caused to rotate, thereby rotating the jack shaft 27 and placing the feeding machine 10 in operation.

The rear conveyor chains 132 and 132a, being positively connected with the jack shaft 27, are continuously moved thereby. However, the front conveyor chains 72 and 72a are moved intermittently in response to pivotal movement of the actuating bar 86 in just one direction around the ratchet shaft 66. That is, when the actuating bar 86 is pivoted in a counterclockwise direction around the shaft 66, as shown in FIGURE 2, the pawl 88 engages the ratchet wheel 87 and effects a corresponding rotation of the shaft 66. This causes the sprockets 69 and 69a (FIGURE 9) on said ratchet shaft 66 to rotate a short distance and thereby advance the chains 72 and 72a a corresponding distance which, in this embodiment, is about one quarter of an inch.

At the same time that the actuating bar 86 is being pivoted by the linkage, including the actuating arm 82 and the link bar 92, the actuating arm 82 and link arm 83 are causing the pivot arm 84 to pivot the pivot shaft 76 and the arm 91. With the pivot arms, such as the arm 84 of FIGURE 5, in their frontwardmost positions, the grid-engaging hooks 109 and 109a (FIGURE 11) will be disposed in their raised positions as shown in FIGURE 13 with respect to the hook 109. The arms 113 and 113a will be firmly engaging the ears 75 and 75a, and the lost motion bars 100 and 100a will be bearing against the rearward pins 102 and 102a on the blocks 97 and 97a.

When the pivot arms 84 and 91 are pivoted rearwardly, the upper ends of the bars 100 and 100a are pivoted rearwardly, whereby the hook bars 112 and 112a are pivoted downwardly. This results in a downward movement of the hooks 109 and 109a until the hooks engage and bite into the upper edges of the ears 75 and 75a on the rearwardmost grid 50. The front pins 101 and 101a are arranged so that they are not normally engaged by the bars 100 and 100a at this time unless there is no grid to be engaged by the hooks.

Continued rearward movement of the arms 84 and 91 acts through the hooks 109 and 109a, the grid 50 and the retarding arms 113 and 113a to move the transfer blocks 97 and 97a rearwardly until the rearwardmost grid is moved past the shoulders 114 and 114a, where the grid 50 drops, or is urged downwardly, onto the edges 111 and 111a of the plates 37 and 36. The other grids 50, which may be piled up behind said rear grid, remain where they were, in so far as the movement of the arms 84 and 91 is concerned. However, the rearward movement of the pivot arms 84 and 91 is accompanied be a counterclockwise movement of the actuating bar 86 (FIGURE 2) whereby the pawl 88 moves the ratchet wheel 87 and effects a corresponding rotational movement of the conveyor chains 72 and 72a, thehreby moving the remaining grids rearwardly, whereby another grid 50 moves into a position of engagement by said hooks.

The grid 50 (FIGURE 4), which has just been dropped onto the edges 111 and 111a, is engaged, preferably at once, by the lugs 138 and 138a on the chains 132 and 132a and moved rearwardly at a relatively fast rate, by comparison to its movement by the conveyor chains 72 and 72a. At the same time, the grid 50 is moved from a vertical position (FIGURE 5) into a substantially horizontal position 50a by the cam plates 141 and 142. The conveyor chains 132 and 132a cause the upper, hence leading, edge of the grid 50 to be advanced between the rollers on the roller shafts 152 and 166, whereby the grid 50 is moved onto the conveyor 196. The operation of the chains 132 and 132a is so timed and the lugs 138 and 138a are so located, that one grid will be advanced between the roller 156, 157, 173 and 174 as another is leaving, thereby placing said grids 50 upon the conveyor 196 in substantially edge-to-edge relationship.

The rearward movement of the arms 84 and 91 (FIGURE 11) preferably terminates when the retarding arms 113 and 113a have moved about an inch, for example, beyond the edges 114 and 114a. When the movement of arms 84 and 91 is reversed, the bars 100 and 100a are pivoted until they engage the pins 102 and 102a, whereby the hooks 109 and 109a are raised above the level of the grids 50 on the chains 72 and 72a. Continued forward movement of the arms 84 and 91 causes the blocks 97 and 97a to be moved forwardly until the retarding arms 113 and 113a snugly engage the pile of grids 50. The pile of grids 50 will normally be moved slightly forwardly by the arms 113 and 113a, thereby squaring the rear grid with the transfer mechanism 110 and accurately positioning said grid for engagement by the hooks 109 and 109a. Thus, the hooks and retarding arms are now in position to effect the engagement and rearward movement of the rearwardmost grid in the manner described above.

While the chains 132 and 132a (FIGURE 4) are advancing a grid toward the rollers, the arms 84 and 91 may be pivoted so that the grid-engaging hooks 109 and 109a will engage the next grid for rearward movement thereof onto the chains 132 and 132a. As mentioned above, each rearward movement of a grid by the grid-engaging hooks is accompanied by a movement of the rear chains 72 and 72a, whereby all the grids supported thereon are moved rearwardly so that another grid is always in position to be engaged.

Although a particular preferred embodiment of the invention has been disclosed above for illustrative purposes, it will be understood that variations or modifications of such disclosure, which lie within the scope of the appended claims, are fully contemplated.

What is claimed is:

1. Feeding means receiving vertically positioned panels in horizontally stacked relationship with respect to each other and discharging them successively in substantially horizontal, edge-to-edge, coplanar relationship with respect to each other, comprising in combination: a discharge conveyor including a pair of spaced discharge conveying units; a feeding conveyor serially arranged with respect to said discharge conveyor and a drive for advancing said feeding conveyor; transfer means movable back and forth between said feeding conveyor and said discharge conveyor for engaging the panel on the feeding conveyor nearest the discharge conveyor and moving it rapidly with respect to the rate of movement of said feeding conveyor off said feeding conveyor and onto said discharge conveyor, said transfer means including means for maintaining said panel in the same attitude with respect to both said conveyors as it moves therebetween, said discharge conveyor being moved sufficiently more rapidly than said feeding conveyor that each panel deposited thereon will move ahead of and out of the way of subsequently following panels; and a cam interposed between the conveying units of said discharge conveyor for rotating said panels from a substantially vertical position into a substantially horizontal position; and means receiving said panels in said horizontal position and discharging them from said discharge conveyor.

2. The apparatus defined in claim 1 wherein said feeding conveyor comprises two transversely spaced conveyor units located on the respective sides of the apparatus; a first support mechanism and a second support mechanism transversely spaced from said first support mechanism, the conveyor unit on one side of the apparatus being supported on the first support mechanism and the conveyor unit on the other side of the apparatus being supported on the second support mechanism, and manually adjustable means for moving said first and said second support mechanisms toward and away from each other at the will of an operator, whereby the conveyor units on said first and second support mechanisms are moved toward and away from each other in order to adjust the relative distance therebetween to panels of different sizes.

3. The apparatus defined in claim 1 including a panel-engaging member affixed to said transfer means, said panel-engaging member having a serrated edge whereby to positively engage the end-most panel of a stack without disturbing the panel adjacent thereto, said transfer means applying said serrated edge to the end-most panel on a stack in an angular direction whereby to cause said serrations to engage only said end-most panel and without engaging the panel next thereto.

4. The apparatus defined in claim 1 wherein said feeding conveyor comprises two transversely spaced conveyor units located on the respective sides of the apparatus; a base structure comprising a first pair of spaced plates having at least two tie rods extending therebetween, a second pair of spaced plates interposed between said first pair of spaced plates and slidably mounted on said tie rods, said conveyor units being mounted on said second pair of plates, and manually operable screw means associated with said second pair of plates for moving same toward and away from each other and thereby adjusting the spacing of said conveyor units.

5. The apparatus defined in claim 1 wherein said drive comprises a drive shaft; a driven shaft and means driven by said driven shaft for driving said feeding conveyor, means including a reciprocable pawl and a ratchet driven thereby for converting rotary motion of said drive shaft into intermittent rotary motion of said driven shaft and thereby intermittently moving said feeding conveyor, and other means also operable from said drive shaft for continuously driving said discharge conveyor at such a speed with respect to the speed of said feeding conveyor that successive panels will not interfere with each other even after they have been moved into a horizontal position.

6. The apparatus defined in claim 3 including also a pair of levers mounted respectively on each side of said apparatus, connecting means holding said levers parallel with respect to each other, means for pivotally oscillating said levers and means movable with the upper ends of said levers and supporting said panel-engaging member for engagement of the rearwardmost panel on said feeding conveyor for moving it from said feeding conveyor onto said discharge conveyor, said panel-engaging member having a plurality of serrated edges, said serrated edges simultaneously engaging the opposite ends of said panel at points each closely adjacent said feeding conveyor.

7. Apparatus for transferring panels from one conveyor to a second conveyor arranged in series therewith, said second conveyor being offset downwardly from said one conveyor, comprising: a transfer block disposed adjacent each of the side edges of said one conveyor at the end thereof adjacent said second conveyor; means supporting said transfer block for lengthwise movement with respect to said one conveyor toward and away from said second conveyor; panel gripping means mounted on each block and disposed over said conveyors, said panel gripping means having a downwardly facing gripping surface for engaging only the upper edge of the panels; means for moving said panel gripping surface into engagement with the upper edge of a panel when said transfer blocks are located remote from said second conveyor and thereafter moving said transfer blocks lengthwise toward the second conveyor whereby said panel is carried from said one conveyor and falls downwardly on to said second conveyor; and means for thereafter moving said panel gripping means upwardly away from said conveyors and for returning the transfer blocks to their original position so that said panel gripping means is then disposed above the next panel to be moved.

8. Apparatus according to claim 7, including guide means engaging said transfer blocks for limiting movement thereof to lengthwise movement with respect to said one conveyor, said panel gripping means being pivotally mounted on said transfer blocks for pivotal movement about a substantially horizontal axis; and means for pivoting said panel gripping means downwardly when said transfer blocks are moved toward said second conveyor and for pivoting said panel gripping means upwardly when said transfer blocks are moved to their original position.

9. Apparatus according to claim 7 includes means for intermittently moving said one conveyor a distance approximately equal to the thickness of a panel in synchronism with the movement of said transfer blocks.

10. Apparatus for transferring panels from one conveyor to a second conveyor arranged in series therewith and movable in substantially the same direction, comprising: a transfer block disposed adjacent each of the side edges of said one conveyor at the end thereof adjacent said second conveyor; means supporting said transfer blocks for lengthwise movement with respect to said one conveyor toward and away from said second conveyor; panel gripping means mounted on each block and disposed over said conveyors, said panel gripping means comprising a member having an angularly disposed, serrated edge engageable with the upper edge of the panel; means for moving said panel gripping means into engagement with a panel when said transfer blocks are located remote from said second conveyor and thereafter moving said transfer blocks toward the second conveyor whereby said panel is carried from said one conveyor to said second conveyor; and means for thereafter moving said panel gripping means away from said panel whereby said panel is placed on said second conveyor and for thereafter returning the transfer blocks to their original position.

11. Apparatus for transferring panels from one conveyor to a second conveyor arranged in series therewith and movable in substantially the same direction, comprising: a transfer block disposed adjacent each of the side edges of said one conveyor at the end thereof adjacent said second conveyor; means supporting said transfer blocks for lengthwise movement with respect to said one conveyor toward and away from said second conveyor; panel gripping means mounted on each block and disposed over said conveyors; a retarding arm mounted on each transfer block and extending therefrom over said one conveyor, said retarding arms being engageable with the forwardmost panel on said one conveyor as said transfer blocks move away from said second conveyor to accurately position the forwardmost panel for the next transferring operation; means for moving said panel gripping means into engagement with a panel when said transfer blocks are located remote from second conveyor and thereafter moving said transfer blocks toward the second conveyor whereby said panel is carried from said one conveyor to said second conveyor; and means for thereafter moving said panel gripping means away from said panel whereby said panel is placed on said second conveyor and for thereafter returning the transfer blocks to their original position.

12. Apparatus for receiving vertically positioned battery grids in horizontally stacked relationship with respect to each other and discharging them successively in substantially horizontal, edge-to-edge, coplanar relationship with respect to each other, comprising: a compartment having vertical sidewalls adjustable toward and away from each other and a horizontally extending support shelf at the upper end of each sidewall; a feeding conveyor consisting of two chains movable through a closed loop, the upper reaches of said chains being disposed above said shelves so that the lugs of the battery grids will be supported on said chains and the main body portions of the grids will extend into said compartment between said sidewalls; a discharge conveyor consisting of two chains movable through a closed path and whose upper reach is disposed adjacent one end of the upper reach of said feeding conveyor, the chains of said discharge conveyor being spaced apart the same distance as the chains of said feeding conveyor; a grid transferring mechanism movable back and forth between said conveyors and including means for engaging the grid on said feeding conveyor nearest the discharge conveyor and moving it horizontally while maintaining it in its vertical position and placing it on said discharge conveyor; means engageable with the grid as it moves along said discharge conveyor for moving the grid into a horizontal position; and means for receiving the grid in said horizontal position when it is discharged from said discharge conveyor.

13. Apparatus according to claim 12 wherein said grid transferring mechanism includes transfer means movable back and forth between said conveyors; grid gripping means mounted on said transfer means and means for moving same into engagement with a grid when said transfer means is moved toward said discharge conveyor and for moving said gripping means out of engagement with the grid when said transfer means is moved away from said discharge conveyor.

14. Apparatus according to claim 13 including means for advancing said feeding conveyor a distance approximately equal to the thickness of a grid in synchronism with the movement of said transfer means.

15. Apparatus for transferring panels from one conveyor to a second conveyor arranged in series therewith and movable in substantially the same direction, comprising: transfer means disposed above said one conveyor at the end thereof adjacent said second conveyor; means supporting said transfer means for lengthwise movement with respect to said one conveyor toward and away from said second conveyor; panel gripping means mounted on said transfer means and disposed over said conveyors, said panel gripping means comprising a member having an angularly disposed serrated edge engageable with the upper edge of a panel; means for moving said panel gripping means into engagement with a panel when said transfer means is located remote from said second conveyor and thereafter moving said transfer means toward said conveyor whereby said panel is carried from said one conveyor to said second conveyor; and means for thereafter moving said panel gripping means away from said panel whereby said panel is placed on said second conveyor and for thereafter returning said transfer means to its position remote from said second conveyor.

References Cited in the file of this patent

UNITED STATES PATENTS

| | | |
|---|---|---|
| 945,870 | Scovill | Jan. 11, 1910 |
| 1,627,764 | Angell | May 10, 1927 |
| 1,961,661 | Fuller | June 5, 1934 |
| 2,051,105 | Roberts | Aug. 18, 1936 |
| 2,081,944 | Lund | June 1, 1937 |
| 2,152,970 | Ness | Apr. 4, 1939 |
| 2,598,222 | Cahners | May 27, 1952 |
| 2,611,470 | Rudolph | Sept. 23, 1952 |
| 2,919,041 | Harrison | Dec. 29, 1959 |